Patented Nov. 24, 1925.

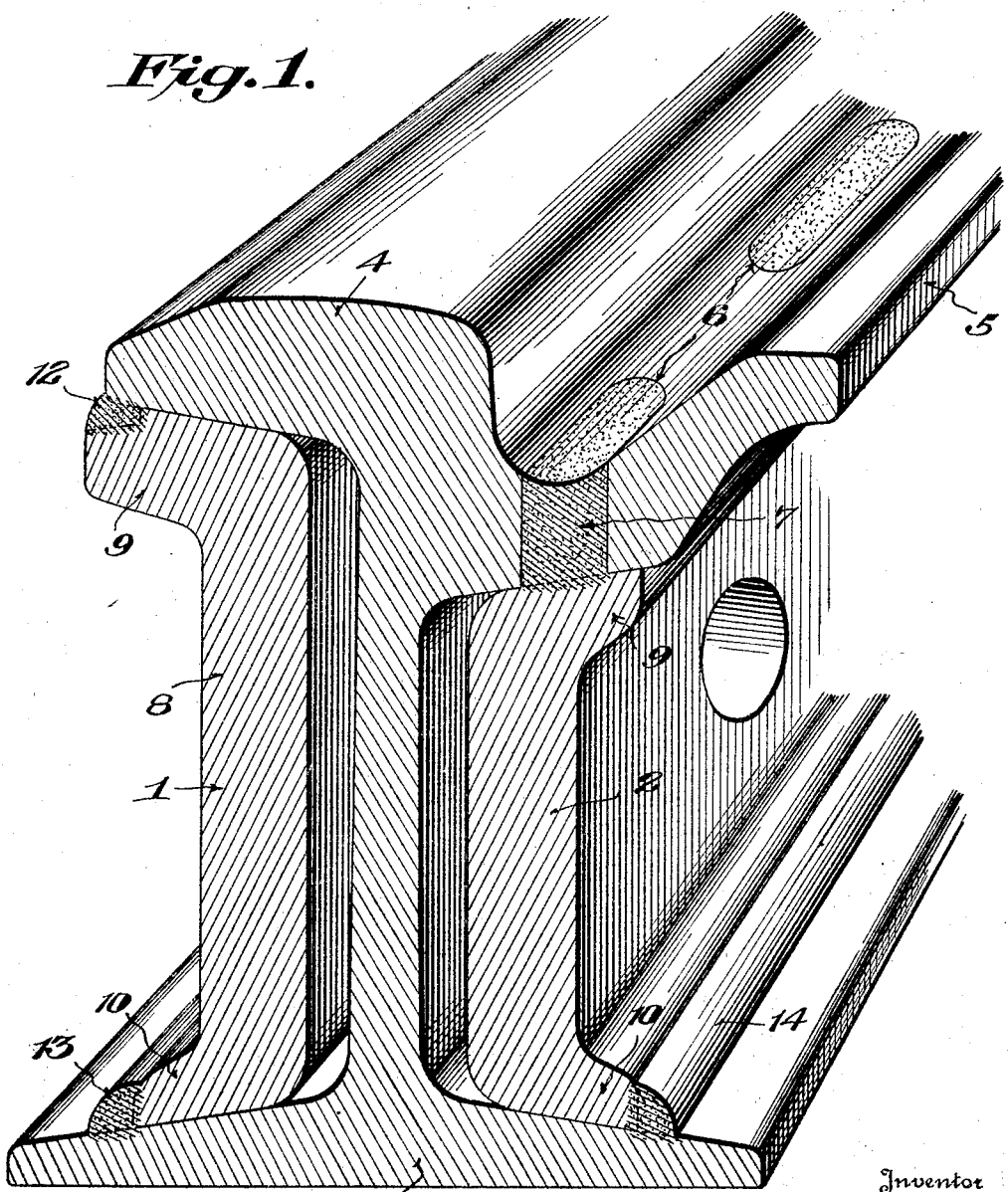

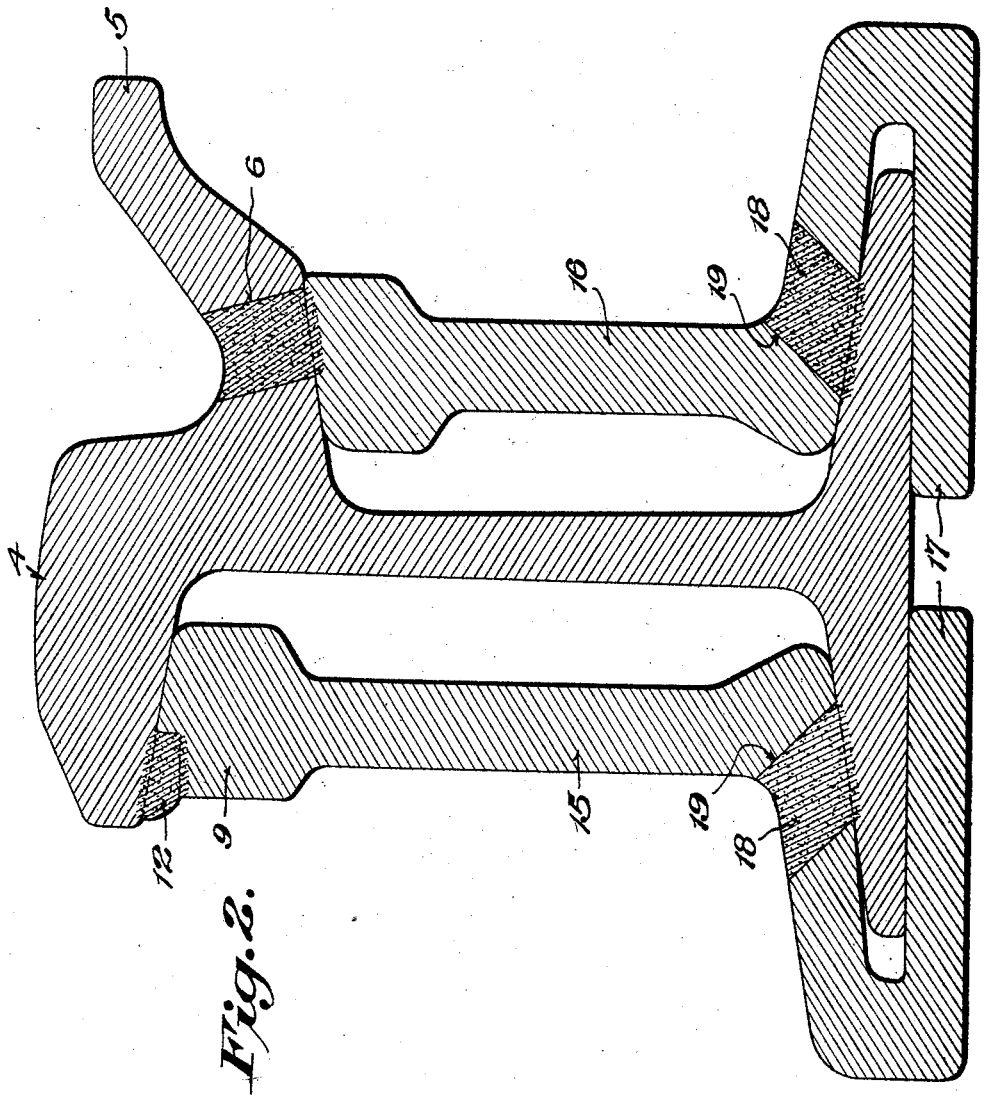

1,562,621

UNITED STATES PATENT OFFICE.

CLARKSON A. DISBROW, OF NEW ROCHELLE, NEW YORK, ASSIGNOR TO THE RAIL JOINT COMPANY, OF NEW YORK, N. Y., A CORPORATION OF NEW YORK.

WELDED RAIL JOINT.

Application filed July 16, 1925. Serial No. 44,053.

*To all whom it may concern:*

Be it known that I, CLARKSON A. DISBROW, a citizen of the United States, residing at New Rochelle, in the county of Westchester and State of New York, have invented certain new and useful Improvements in Welded Rail Joints, of which the following is a specification.

This invention relates to the subject of welded rail joints, and primarily has in view the provision of novel and practical means for welding the joint bar to the rail in such a manner as to not only effect a strong welding union between the metal parts, but also to provide a strong mechanical rail joint.

Heretofore the practice in making welded rail joints has not fully taken into consideration the desirability of providing a thoroughly effective rail joint, possessing the necessary stiffness and strength to assume and distribute the loading and deflection strains. Also in some form of welded rail joints, particularly those adapted to the girder type rail the welding spaces or locations are difficult of access for the welding tools thereby encouraging poorly made and defective welds. The present invention, however, fully takes into consideration all of these factors and provides a construction for welded rail joints in which the welding positions are freely and openly accessible to the welder so that a weld of large capacity can easily be made, and in such form as to make it impossible for the weld to be disrupted or broken by extraneous or accidental means.

With these and other objects in view which will appear to those familiar with the art, the invention consists in the novel structural feature hereinafter fully described, illustrated and claimed, and while the improvement is susceptible of modification without departing from the scope of the invention, certain practical examples, containing the invention, are shown in the accompanying drawings, in which—

Figure 1 is a sectional perspective view of one form of welded rail joint embodying the present invention.

Figure 2 is a cross sectional view illustrating the invention applied to another type of rail joint.

Like references designate corresponding parts in the two figures of the drawings.

A preferable form of the invention is shown in Figure 1 of the drawings wherein the oppositely located joint bars 1 and 2 are shown associated with a girder rail 3. In this type of welded joint the high joint bar, as it is generally termed, is located at the outside of the joint and engages the fishing surface at the underside of the main head portion 4 of the girder rail and the fishing surface at the upper side of one of the base flanges of the rail, while the so-called "low" bar 2 is located at the inside of the joint and engages the fishing surface at the underside of the inner rail head flange 5 of the girder rail and the fishing surface at the underside of the upper rail base flange.

Ordinarily the welding operation is difficult and unreliable to weld the upper part of the low bar to the rail head and flange 5. That is due to the fact that the fishing at the inner side of a girder rail is very deep and the rail head flange 5 overhangs and masks the upper edge of the joint bar 2 to a very considerable extent and thereby interfering with the application and use of the welding tools, resulting very frequently in the production of imperfect and easily broken welds. The difficulties and objections referred to in connection with the ordinary methods of welding the low bar of the welded rail joint to the underside of the rail head flange of a girder rail are obviated by the present invention which primarily involves the provision of suitably spaced welding holes 6 which pierce the rail head flange 5 at the bottom of its groove or valley. These welding holes 6 may be elongated so as to be in the form of slots as shown in Figure 1 of the drawings or may be of any desirable shape or configuration, the essential feature being that each of the welding holes 6 vertically pierces the rail head flange 5 in the bottom of its groove or flangeway in the vertical plane of that part of the rail joint bar 2 which is to be welded to the rail head flange 5.

Accordingly, as clearly appears in Figure 1 of the drawings, when the inner joint bar 2 is in position within the fishing spaces of the rails at the inside of the joint the upper edge of the bar comes directly beneath all of the welding holes 6, thereby permitting the welding operation to be performed from above the rail and directly through the welding holes. This simply involves placing the necessary welding material 7, as for instance Thermit, in the hole 6 and then applying the welding heat by oxyacetylene torch or otherwise with the result of fusing the welding material and the contiguous parts of the rail and the metal in the joint bar 2, with the result of obtaining a weld of large capacity which securely fastens the joint bar to the flange of the rail while at the same time being located, confined, and protected in an entirely out of the way position at the bottom of the flangeway of the rail head flange 5 so that the welds cannot be injured or disturbed by any accidental or extraneous forces.

The invention is necessarily applicable to rail joint bars of this type, as for instance in the preferred construction shown in Figure 1 of the drawings the rail joint bars 1 and 2 are of a very practical form each consisting of a web member 8 substantially paralleling the rail web and top and bottom outturned flanges 9 and 10 which respectively engage the fishing surfaces of the rail head and the rail base flange. In the joint shown in Figure 1 of the drawings the upper joint bar flange 9 is welded at its upper outer corner to the bottom corner of the rail head by a suitable weld 12, and the lower flange 10 of the outer joint bar is welded to the rail base flange by a suitable fillet weld 13. The inside or lower bar 2 of the joint shown in Figure 1 of the drawings is shown as of a reversible type so that either flanged edge may be placed beneath the rail head flange 5. Also in the joint referred to the bottom flange 10 of the inside or low bar 2 may be conveniently fastened to the base flange of the rail by a suitable fillet weld 14.

Another application of the invention is shown in Figure 2 of the drawings wherein both of the outside and inside joint bars respectively designated by the reference numbers 15 and 16 are of the continuous type of joint bar, that is, each of said bars, in addition to its usual head, web and foot portions, is provided with an inturned rail base supporting flange 17 engaging beneath the rail bases. In this adaptation of the invention there is shown a construction wherein the lower portions of the joint bars are fastened to the rail base flanges by welds 18 formed in welding holes 19 which pierce the foot flanges of the bars over the upper sides of the rail base flanges, but no claim is made herein to that manner of welding the lower portion of the joint bar to the rail base flange. As to the head portions of the continuous type rail joint bars 15 and 16 the same are welded respectively to the main head and rail head flange of the rail in substantially the same manner as shown and described in connection with Figure 1.

From the foregoing it is thought that the construction and many advantages of the herein described improvement in welded rail joints will be apparent without further description and it will be understood that changes in the form, proportion and minor details of construction may be resorted to without departing from the spirit or sacrificing any of the advantages of the invention.

I claim:—

1. A welded rail joint including a rail having a welding hole in its head and a joint bar fitting the rail beneath said hole.

2. A welded rail joint including a girder rail having a welding hole in its rail head flange, and the joint bar fitting the rail beneath said hole.

3. A welded rail joint including a girder rail having a welding hole piercing its inside flange at the bottom of the flangeway therein, and the joint bar fitting the rail beneath the welding hole.

4. A welded rail joint including a girder rail provided in its inside flange with a plurality of welding holes entirely piercing such flange, and the joint bar fitting the underside of the rail head flange beneath said welding holes.

5. A welded rail joint including a girder rail having in its inside flange a plurality of welding holes entirely piercing the same, a joint bar fitting the underside of said rail head flange beneath said holes and welds formed in said holes and on top of the joint bar.

In testimony whereof I hereunto affix my signature.

CLARKSON A. DISBROW.